(12) United States Patent
Hosseini et al.

(10) Patent No.: US 10,317,707 B2
(45) Date of Patent: Jun. 11, 2019

(54) OPTICAL DEVICE

(71) Applicant: OXFORD UNIVERSITY INNOVATION LIMITED, Oxford, Oxfordshire (GB)

(72) Inventors: Peiman Hosseini, Bicester (GB); Harish Bhaskaran, Horton-cum-Studley (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 15/742,080

(22) PCT Filed: Jul. 8, 2016

(86) PCT No.: PCT/GB2016/052065
§ 371 (c)(1),
(2) Date: Jan. 5, 2018

(87) PCT Pub. No.: WO2017/013394
PCT Pub. Date: Jan. 26, 2017

(65) Prior Publication Data
US 2018/0203261 A1    Jul. 19, 2018

(30) Foreign Application Priority Data
Jul. 22, 2015  (GB) .................................. 1512914.1

(51) Int. Cl.
*G02F 1/00* (2006.01)
*G02F 1/19* (2019.01)
(Continued)

(52) U.S. Cl.
CPC .............. *G02F 1/0063* (2013.01); *E06B 9/24* (2013.01); *G02F 1/0311* (2013.01); *G02F 1/19* (2013.01);
(Continued)

(58) Field of Classification Search
CPC .. G02F 1/01; G02F 2203/50; G02F 2001/212; G02F 1/0123; G02B 26/06
(Continued)

(56) References Cited

U.S. PATENT DOCUMENTS

| | | | |
|---|---|---|---|
| 5,278,590 A | 1/1994 | Phillips et al. | |
| 8,643,936 B2 * | 2/2014 | Hong | G02B 26/001 136/257 |

(Continued)

FOREIGN PATENT DOCUMENTS

| | | |
|---|---|---|
| EP | 0395410 A2 | 10/1990 |
| EP | 1044934 A2 | 10/2000 |

(Continued)

OTHER PUBLICATIONS

International Search Report and Written Opinion prepared by the European Patent Office dated Sep. 16, 2016, for International Application No. PCT/GB2016/052065.

(Continued)

*Primary Examiner* — Mohammed A Hasan
(74) *Attorney, Agent, or Firm* — Jason H. Vick; Sheridan Ross, PC

(57) ABSTRACT

A transmissive optical device comprising: a layer (10) of light absorber material in the solid state, preferably made of a phase-change material with switchable refractive index such as GeSbTe; a partially-reflective layer (12), and a spacer layer (14) between the layer (10) of light absorber material and the partially-reflective layer (12). The spacer layer (14) and an optional coverlayer (16) may be transparent conductive ITO layers which may serve to electrically switch the phase of the phase-change material layer (10), thereby switching the transmission/reflection properties of the transmissive optical device.

17 Claims, 3 Drawing Sheets

(51) Int. Cl.
*G02F 1/21* (2006.01)
*E06B 9/24* (2006.01)
*G02F 1/03* (2006.01)
*G01J 3/02* (2006.01)

(52) U.S. Cl.
CPC .......... *G02F 1/21* (2013.01); *E06B 2009/247* (2013.01); *E06B 2009/2417* (2013.01); *E06B 2009/2464* (2013.01); *G01J 3/0229* (2013.01); *G02F 2001/213* (2013.01); *G02F 2201/08* (2013.01); *G02F 2203/055* (2013.01)

(58) Field of Classification Search
USPC ........................................................ 359/279
See application file for complete search history.

(56) References Cited

U.S. PATENT DOCUMENTS 8,917,440 B2   12/2014   Kim et al.
9,110,289 B2*  8/2015    Miles ................... G02B 26/001
2006/0119774 A1  6/2006  Chen
2007/0125667 A1  6/2007  Lee et al.
2010/0032551 A1  2/2010  Schulz et al.
2010/0225989 A1  9/2010  Anders
2012/0014161 A1  1/2012  Pickett et al.

FOREIGN PATENT DOCUMENTS

JP      2005-243165 A       9/2005
WO      WO 2013/184556      12/2013
WO      WO 2014/201559      12/2014

OTHER PUBLICATIONS

Hosseini, Peiman et al. "An Optoelectronic Framework Enabled by Low-Dimensional Phase-Change Films" Nature, vol. 511; Jul. 10, 2014, pp. 206-211.
Written Opinion for International Application No. PCT/GB2016/052065, dated Sep. 28, 2016.

* cited by examiner

OPTICAL DEVICE

CROSS REFERENCE TO RELATED APPLICATIONS

This application is a national stage application under 35 U.S.C. 371 of PCT Application No. PCT/GB2016/052065, having an international filing date of 8 Jul. 2016, which designated the United States, which PCT application claimed the benefit of Great Britain Patent Application No. 1512914.1 filed 22 Jul. 2015, the contents of each of which are incorporated herein by reference in their entirety.

BACKGROUND OF THE INVENTION

The present invention relates to an optical device that is transmissive.

There has been a desire for improved optical filters whose spectral characteristics can be customised, which are stable and feasible to fabricate, and which are compact. There are real-world applications for such optical devices in at least the visible and infrared parts of the spectrum.

In some fields it is desirable to be able to change the transmission properties in use, such as for see-through displays, security applications or for light and/or heat control.

The present invention has been devised in view of the above problems.

Accordingly, the present invention provides a transmissive optical device comprising:
a layer of light absorber material in the solid state;
a partially-reflective layer, and
a spacer layer between the layer of light absorber material and the partially-reflective layer.

Further optional aspects are defined in the dependent claims.

Throughout this specification, the terms 'optical' and 'light' are used, because they are the usual terms in the art relating to electromagnetic radiation, but it is understood that in the context of the present specification they are not limited to visible light. It is envisaged that the invention can also be used with wavelengths outside the visible spectrum, such as infrared and ultraviolet light.

BRIEF DESCRIPTION OF THE DRAWINGS

Embodiments of the invention will now be described, by way of example only, with reference to the accompanying drawings in which.

DETAIL DESCRIPTION OF THE INVENTION

Figure 1:
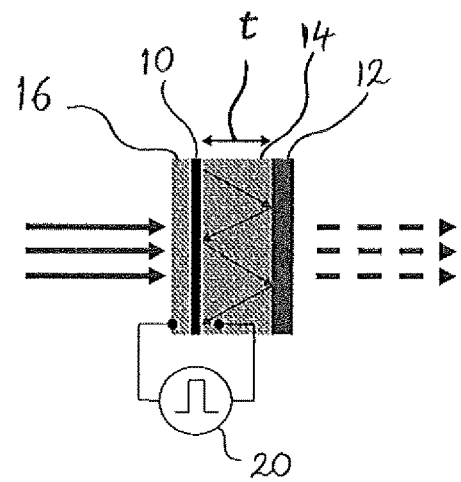
FIG. 1 is a schematic cross-section of a portion of an optical device according to an embodiment of the invention.

A first embodiment of a transmissive optical device will now be described with reference to FIG. 1, which shows schematically a layered structure in cross-section. A solid layer of light absorber material 10 is provided. This layer is also knows as a thin film absorber, and the material typically has an imaginary component of refractive index (k) that is non-zero over a wide range of wavelengths. Many suitable materials can be used, and some specific examples are given later. The layer 10 is generally less than 100 nanometers thick, such as in the range of 5 to 15 nanometers thick. In this specific embodiment, the absorber material is $Ge_2Sb_2Te_5$ (GST) and the layer 10 is 7 nanometers thick.

The absorber material layer 10 is provided on a partially reflective layer 12. A spacer layer 14 is sandwiched between the absorber layer 10 and the partially-reflective layer 12. An optional capping layer 16 is provided on the front side of the device. In this specific embodiment, the spacer layer 14 and the capping layer 16 are made of indium tin oxide (ITO), which is electrically conductive, and so provides electrical contact with the material of the absorber layer 10, however, in general, it is not necessary for them to be electrically conductive, nor to be made of the same material. The spacer layer 14 and the capping layer 16 are both optically transmissive, and are ideally as transparent as possible.

Light incident from the left of FIG. 1 on to the front side of the device (capping layer 16), indicated by the solid arrows, is at least partially transmitted through the device and exits as shown by the dashed arrows in FIG. 1 because the layer 12 is only partially reflective. However, absorption by the absorber material layer 10, and interference effects between the layer 10 and the layer 14 governed by the thickness t of the spacer layer 14, alters the spectrum of the transmitted light. In other words, the transmission through the device varies as a function of wavelength. FIG. 2(a) shows the transmission percent as a function of wavelength for five different values of thickness t of the spacer layer 14. Clearly, significantly different transmission spectra are obtained for different thicknesses t. So the device can act as a color filter, and has a colored appearance when substantially white light is viewed through it.

Figure 2:
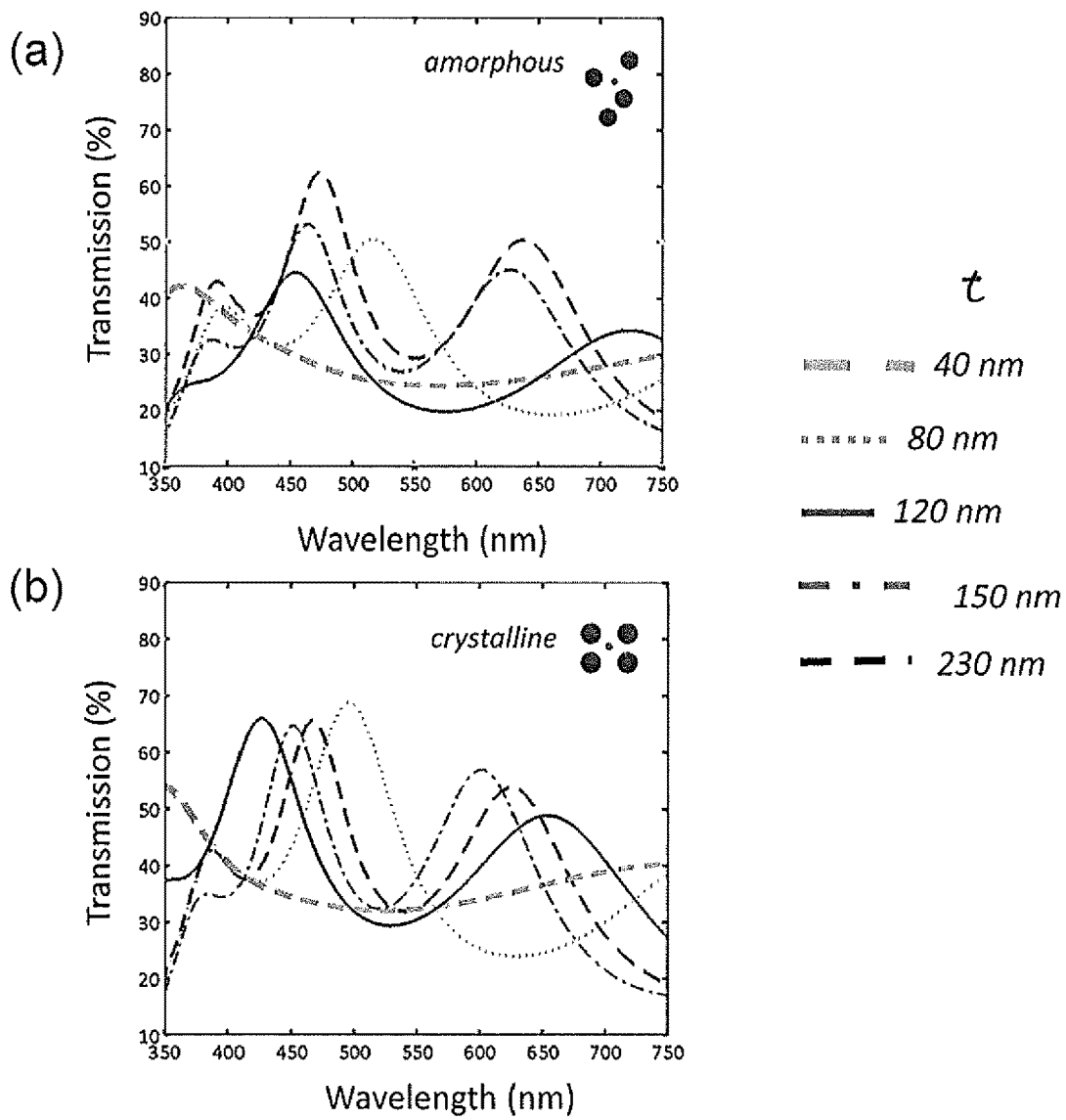
FIGS. 2(a) and 2(b) are plots of transmission against wavelength for several different thicknesses of the spacer layer of a device according to an embodiment of the invention.

FIG. 2 relates to the specific embodiment in which the absorber layer 10 is composed of GST, a phase-change material (PCM). The transmission spectra of FIG. 2(a) are for the device when the GST is deposited in amorphous form. However, by applying a suitable voltage pulse from a voltage source 20, the GST can undergo an induced reversible phase change to cause it to crystallise. FIG. 2(b) shows the corresponding transmission spectra with the GST in the crystalline form. As can be seen, a significantly different set of spectral responses (different broadband color filters) are obtained.

Figure 3:
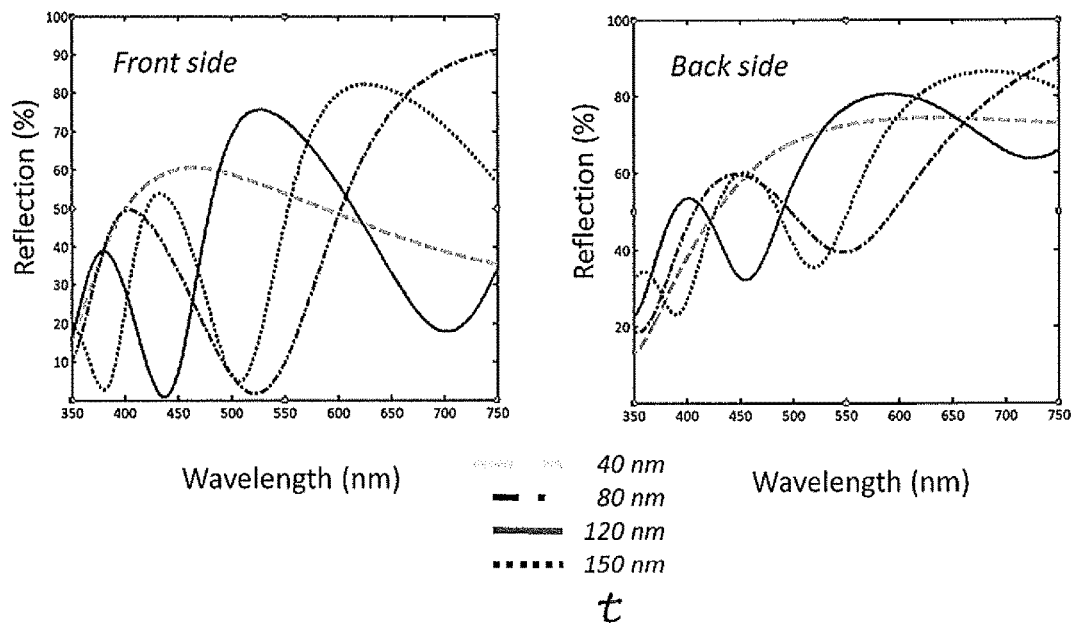
FIG. 3 shows plots of reflection against wavelength for several different thicknesses of the spacer layer of a device according to an embodiment of the invention.

FIG. 3 shows the reflection spectra for the same device for several different thicknesses t of the spacer layer 14. Interestingly, the color (spectrum) observed in reflection is different depending on which side the device is illuminated and viewed from; the plots in the left hand graph of FIG. 3 are for reflection viewed form the front side (capping layer 16); and the plots in the right hand graph of FIG. 3 are for the device viewed from the back side (partially-reflective layer 12).

Materials

In many applications, the light absorber material layer 10 does not specifically have to be a phase change material, although it can be. If the property of electrically switching state is not used, then the voltage source 20 in FIG. 1 is omitted. The layer 10 is provided as an ultra-thin absorber layer, preferably less than 10 nm thick. Examples of suitable materials for the absorber include: any of the phase change materials mentioned below; plus amorphous silicon, amorphous carbon, Ge, GaAs, InAs, InP, CdTe, $Ag_2S$, organic semiconductors; any suitable material that absorbs light and can be deposited into films a few nm thick (semiconductor materials are typically ideal for this). The stoichiometry can be changed and doping can be used to create the desired absorber properties. In fact, it is not necessary to use materials that absorb light in the bulk state; such materials can be engineered to create metamaterials that have the desired properties in terms of absorption.

Many suitable phase-change materials are available, either separately or in combination, including compounds or alloys of the combinations of elements selected from the following list: GeSbTe, GeTe, GeSb, GaSb, AgInSbTe, InSb, InSbTe, InSe, SbTe, TeGeSbS, AgSbSe, SbSe, GeSbMnSn, AgSbTe, AuSbTe, and AlSb. It is also understood that various stoichiometric forms of these materials are possible; for example $Ge_xSb_yTe_z$; and another suitable material is $Ag_3In_4Sb_{76}Te_{17}$ (also known as AIST). Other suitable materials include any of the so-called "Mott memristors" (materials that undergo a metal-to-insulator transition, MIT, at some specific temperature), for example $VO_x$ or $NbO_x$. Furthermore, the material can comprise one or more dopants, such as C or N.

Such so-called phase-change material (PCM), undergoes a drastic change in both the real and imaginary refractive index when switched between amorphous and crystalline phases. The switching can be achieved for example by heating induced by suitable electric pulses or by a light pulse from a laser light source, or can be thermal heating for example using electrical resistive heating of an adjacent layer that is in thermal contact with the phase change material. There is a substantial change in the refractive index when the material is switched between amorphous and crystalline phases. The material is stable in either state. Switching can be performed an effectively limitless number of times. However, it is not essential that the switching is reversible.

A further enhancement applicable to all embodiments is that the material of the layer 10 does not have to be switched simply between a fully crystalline and a fully amorphous state. A mixture of phases can be achieved, such as 20% crystalline, 40% crystalline etc. The resulting effective refractive index of the material is somewhere between the two extremes of fully crystalline and fully amorphous depending on the degree of partial crystallisation. Between 4 and 8 distinct mixed phases can be readily achieved, having the corresponding number of different detectable reflectivities, but with appropriate control, the number can be much higher, such as 128.

Although some embodiments described herein mention that the material layer is switchable between two states such as crystalline and amorphous phases, the transformation could be between any two solid phases, including, but not limited to: crystalline to another crystalline or quasi-crystalline phase or vice-versa; amorphous to crystalline or quasi-crystalline/semi-ordered or vice versa, and all forms in between. Embodiments are also not limited to just two states.

In the preferred embodiment, the absorber material layer 10 is composed of is $Ge_2Sb_2Te_5$ (GST) less than 100 nm thick, and preferably less than 10 nm thick, such as 6 or 7 nm thick.

The spacer layer 14 and the (optional) capping layer 16 are both optically transmissive, and are ideally as transparent as possible. In the first example, the spacer layer 14 and the capping layer 16 are made of indium tin oxide (ITO), but it is not necessary for them to be electrically conductive (unless used in switchable devices where those layers act as electrodes), nor is it necessary for them to be made of the same material. Other suitable materials include silica, alumina, zinc sulfide, and polymeric materials, but any solid transparent or semi-transparent material could be used. An example of the thickness of the spacer layer 14 is anything less than 300 nm. The capping layer 16 protects the surface and examples have a thickness in the range of from 5 to 50 nm, for example 20 nm.

The partially-reflective layer 12 is typically a thin metal film, with a thickness in the range of from 5 to 15 nm, composed for example of Au, Ag, Al, or Pt.

The whole structure shown in FIG. 1 can be provided on a substrate (not shown) such as a glass, quartz, or plastics material, polycarbonate, PET etc. The layers are deposited using sputtering in the case of inorganic material layers such as the absorber material 10, ITO, $SiO_2$, and so on, which can be performed at a relatively low temperature of 100 C or even 70 C or lower. Polymeric layers can be formed by spin-coating and curing. Additional layers may also be provided as necessary. The low temperature process means that the optical device does not have to be fabricated at the same time as the article comprising the substrate (the article might be, for example, window glazing); the optical device can be retro-fitted as a surface coating applied later e.g. to existing windows or panels.

Applications

Optical devices according to any of the embodiments herein can be used as transmissive color (spectral) filters (either switchable or fixed), such as ultra-thin color filters for LCD/OLED displays and projectors. They can also be used in see-through displays, such as head-up displays (HUDs).

Optical devices according to any of the embodiments herein could be used as transmissive security marks, applied to articles, packaging, ID badges/passes, bank notes and so forth. A pattern can be stored in the phase change material layer by setting the crystallographic state of different regions. The pattern could simply be a recognisable image, or could encode specific information, such as being in the form of a bar code, QR code, or other suitable code. A pattern is not essential because one could just relying on the predetermined color change or spectral response intrinsic to the optical device that is difficult to replicate.

In one embodiment, the security mark is on a flexible substrate, such as a smart label or ID film, which can be bent to reveal a known change in color or to reveal a pattern to security personnel. The change in color and/or revelation of a pattern occurs because bending the device modifies the thickness of the layers, particularly the spacer layer, and so changes the spectral transmission response of the device.

A further variant is when the mark is defined using a pattern of mott memristor, such as $VO_x$ or $NbO_x$, as the phase change material. A change in color contrast occurs when the mark is heated above the transition temperature, so the security mark can be revealed by heating the device, and the mark disappears when it cools down again.

A device reader incorporating a simple spectrometer could assess the color variation of the mark at different angles (with or without bending) and compare that with a previously stored response to validate the authenticity of the mark with extremely high confidence.

Another device reader uses one or more low-power laser diodes to measure the transmissivity at fixed wavelength as a function of angle, and compares with a known response.

In the case of a pattern written into the mark, a device reader could include a camera to capture one or more images of the mark under particular illumination wavelengths or angles, and could employ contrast comparison and or image recognition to verify the mark.

With any of the security marks described above, the mark can, of course, be erased and/or rewritten using appropriate switching means, as previously described (such as laser, electric or thermal). This enables versatile security hierarchies, for example where the user's card is verified at a first checkpoint at which the device reader also writes second information to the mark. A second checkpoint then verifies that the second information is present and then erases and/or writes further information. In this way, the checkpoints can only be passed in sequence; and bypassing a checkpoint will cause access as subsequent checkpoints to be denied.

Figure 4:
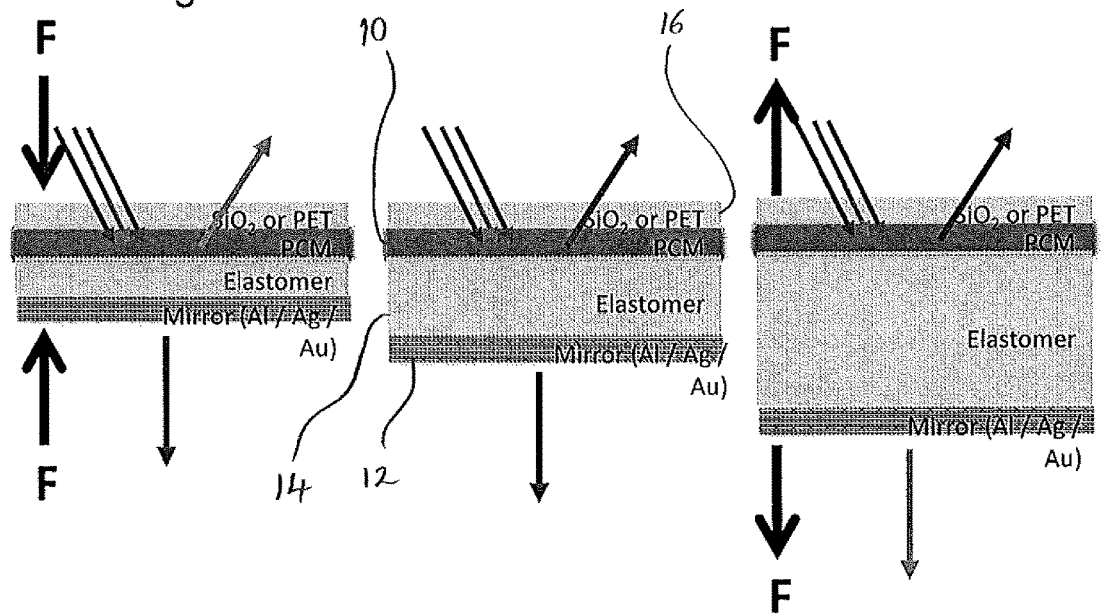
FIG. 4 is a schematic illustration in cross-section of an embodiment of the invention in which the thickness of the spacer layer is mechanically variable.

Another application of the optical device is as a mechanically active color changing film e.g. as a force sensor, as well as in security marks discussed above. Referring to FIG. 4, the middle illustration shows the device in the relaxed state transmitting light with a particular spectrum. When a force F is applied to the layered device, the thickness t of the spacer layer 14 changes, which affects the apparent color of the device. The left-hand portion of FIG. 4 shows a compressive force F applied to the device, and the right-hand portion of FIG. 4 shows an expansive force F applied to the device. The resulting change in color is instantaneous, reversible (within the elastic boundaries of the material), and directly related to the applied force over a wide range. Therefore, the optical device provides a force sensor. To read the force, the color of the device is compared to calibrated colors (spectra) with known applied force. This can be done by eye, or with a simple camera, or with a more sophisticated spectrometer. The precision of the force measurement is defined by the quality of the optical measurement.

In the force sensor, the spacer 14 can be any optically transmissive (ideally transparent) material that can be compressed by force to change thickness t and hence change color of the device. The elastic modulus of the material will dictate the sensitivity and working range of forces of the device. The material must work within its elastic regime, otherwise permanent deformation will alter the device characteristics and calibration. In the preferred embodiment, the spacer 14 is a soft material with high compressibility, such as an elastomer. Any substantially transparent elastomer is appropriate. One example is PMMA (polymethylmethacrylate); another example is any silicone, such as polydimethylsiloxane (PDMS). A typical thickness of the spacer 14 is in the range from 10 nm to 300 nm, for example 150 nm.

Other means for changing the thickness t of the spacer layer 14 to change the transmission spectrum of the device include:

electrically, using an electrically actuated elastomer;

using microfluidics, in which a transparent liquid is pumped into or out of a cavity at the spacer layer 14 to change its thickness; and piezoelectrically, using materials (such as PZT) that change shape when an electrical signal is applied to them.

Although the transmission spectra of FIG. 2 relate principally to the visible part of the electromagnetic spectrum, transmissive-type films can also be used to modulate other parts of the spectrum, such as infrared (IR) light. Thus, IR filters for transmission or reduction of particular bands can be fabricated. If a switchable absorber material layer 10 is used, then the device can be applied as a surface coating for glazing for thermal management e.g. for buildings. A large change in transmittance in the infrared part of the spectrum can be achieved between the amorphous and crystalline states of the absorber layer such that the change in total infrared energy transmitted through the device can be switched by more than 25%. Thus solar infrared light energy can be transmitted through the glazing to provide heating for the interior of the building, or the device can be switched to reflect more infrared to reduce unwanted heating of the interior of the building.

By appropriate choice of materials and layer thicknesses, the device can provide a large change across the infrared part of the spectrum, whilst only affecting the visible light to a much smaller degree. For example the total energy transmitted at the visible wave lengths may be effected by less than 20%. In this way, the brightness of visible light admitted into the building through the glazing can be maintained, while still unobtrusively regulating the heat energy (infrared) transmitted. In other words, the visible appearance does not necessarily change or appear tinted even when changing the infrared transmission. A specific example of a structure for this application comprises 10 nm of ITO as a capping layer and electrode; a 10 nm thick layer of GST as the switchable absorber layer; a 95 nm thick layer of ITO as spacer layer (and second electrode for switching the GST); and a 15 nm thick silver layer as the partially-reflective layer.

Spectrometer

There is a type of spectrometer known as a broadband-filter-based spectrometer. Light representing the spectrum to be analysed is passed through a broadband filter with known transmission characteristics as a function of wavelength. Different bands are attenuated by different amounts and the resulting light reaches a single detector which provides a single resulting total intensity value. This process is repeated with multiple broadband filters, each of which modifies the spectrum in a different way. From the known transmission spectra of all of the broadband filters, and the intensity measurements, the original spectrum can be reconstructed computationally.

Figure 5:
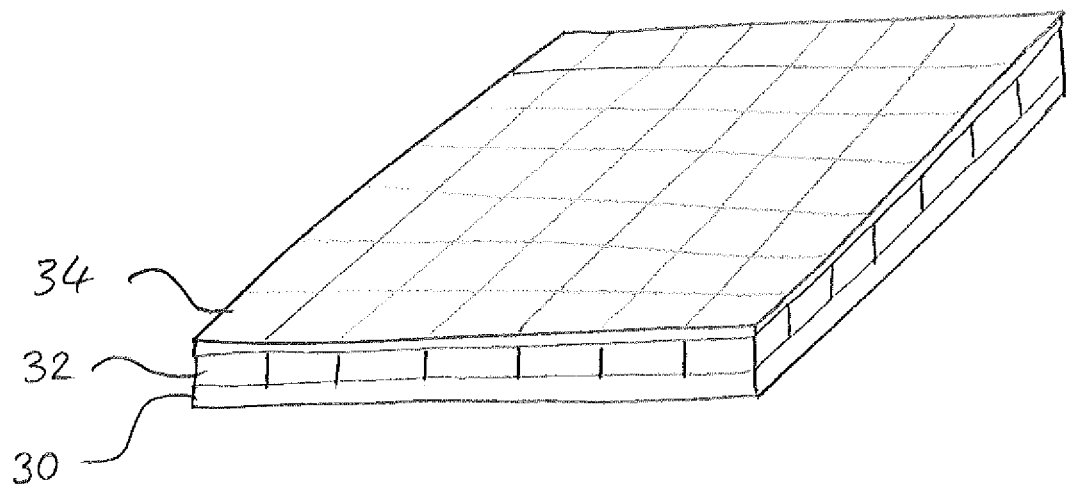
FIG. 5 is a schematic illustration of a spectrometer as the optical device according to a further embodiment of the invention.

The spectrometer can be made more efficient by measuring the set of intensities simultaneously. One embodiment for doing this is illustrated in FIG. 5. A substrate 30 is provided with a two dimensional array of a detectors 32, such as charge-coupled devices (CCDs). In front of the detector array is a set of spectral filters 34 each comprising a transmissive filter, such as previously described, with at least a layer of light absorber material, a spacer layer, and a partially-reflective layer. By adjusting the composition and/or thicknesses of the layers, the spectral transmission of each filter 34 can be different.

Figure 6:
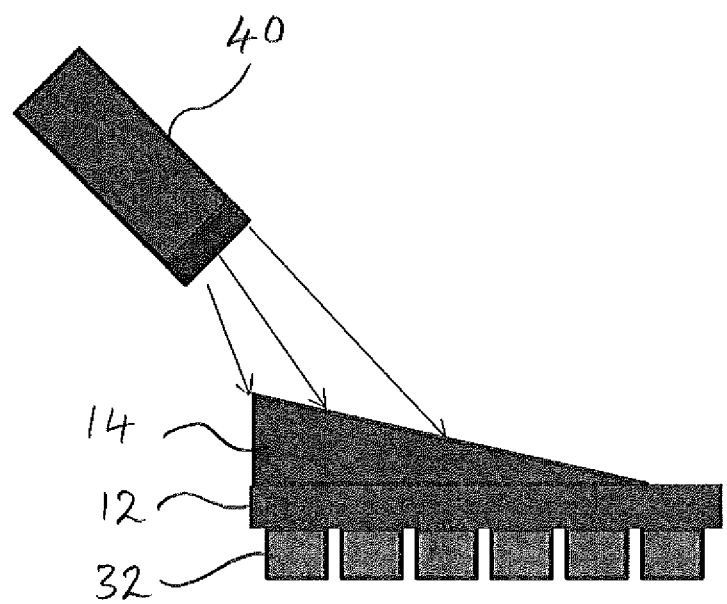
FIG. 6 is a schematic cross-section illustrating a step in a method of making the device of FIG. 5.

Although illustrated in FIG. 5 as one filter 34 per detector 32, this does not have to be the case, and one filter could serve multiple detector elements. Furthermore, the filters 34 do not each have to be discretely fabricated. One technique for creating a continuous filter array is illustrated in FIG. 6. A thin metal layer as the partially-reflective layer 12 is deposited on an array of detectors 32. The device is then tilted with respect to a sputtering gun 40. A spacer layer 14 is then sputtered on to the device, but a natural thickness gradient is created in the layer 14 because the parts further away from the gun will have less material deposited. Next, the gun and substrate are reset such that the remaining layers e.g. 10 and 16 of FIG. 1 are deposited with uniform thickness.

This structure and technique makes the device simple to fabricate cheaply and quickly on a CCD array to provide a spectrometer-on-a-chip. The device can be used as a spectrometer for infrared and ultraviolet, as well as visible, and is stable on exposure to electromagnetic radiation across the spectrum. The number of different filters 34 and detectors 32 in the array can be of the order of a few hundred, or even many more, and this number will determine the spectral resolution. A spectral resolution of +/−1 nm can be achieved.

A further application of any of the devices described above is as a decorative layer. For example, the lenses of sunglasses can be provided coated with the optical device. The color and pattern could be predetermined and/or could be changed subsequently.

The invention claimed is:

1. A transmissive optical device comprising:
a layer of light absorber material in the solid state, where in the light absorber material is a phase-change material having a refractive index that is settable to at least two values which confer different optical transmission properties to the device;
a switching means configured to switch the phase-change material between different set values of the refractive index by heating induced by passing an electric pulse through the phase change material or by electrical resistive heating of an adjacent layer that is in thermal contact with the phase-change material; and
a partially reflective; wherein either the partially-reflective layer is less than 20 nm thick or the partially-reflective layer comprises metal; and
a spacer layer between the layer of light absorber material and the partially-reflective layer.

2. A device according to claim 1, wherein the partially-reflective layer comprises at least one of Ag, Au, Pt and Al.

3. A device according to claim 1, wherein the partially-reflective layer has a thickness in the range of from 5 to 15 nm thick.

4. A device according to claim 1, wherein the spacer layer has a thickness in the range of from 5 to 300 nm.

5. A device according to claim 1, wherein the thickness of the spacer layer is adjustable, in use, to alter the optical transmission properties of the device.

6. A device according to claim 1, wherein the thickness of the spacer layer is adjustable by at least one of: mechanically, electrically, using microfluidics and piezoelectrically.

7. A device according to claim 1, wherein said spacer layer comprises a compressible material, preferably an elastomeric material.

8. A device according to claim 1, wherein different portions of the phase-change material layer are set to different refractive index values to define a pattern.

9. A device according to claim 8, wherein the refractive index value of each of the portions is individually settable.

10. A device according to claim 1, wherein the phase-change material comprises a compound or alloy of a combination of elements selected from the following list of combinations: $GeSbTe$, $VO_x$, $NbO_x$, $GeTe$, $GeSb$, $GaSb$, $AgInSbTe$, $InSb$, $InSbTe$, $InSe$, $SbTe$, $TeGeSbS$, $AgSbSe$, $SbSe$, $GeSbMnSn$, $AgSbTe$, $AuSbTe$, and $AlSb$.

11. A device according to claim 1, wherein the layer of phase-change material has a thickness in the range of from 5 nm to 15 nm.

12. A device according to claim 1, wherein the transmission of infrared light is adjustable by at least 25% while the total energy transmitted at visible wavelengths is affected by less than 20%.

13. A device according to claim 1, wherein the thickness of the spacer layer varies across the device.

14. A device according to claim 1 comprising a plurality of regions of different spectral transmission properties.

15. A device according to claim 13 provided on an array of optical detectors.

16. A display, a security mark, a color filter, a decorative layer, a spectrometer or a window comprising an optical device according to claim 1.

17. A device according to claim 1, wherein the transmission of infrared light is changed without changing the visible appearance of the device.

* * * * *